(12) United States Patent
Setlonok

(10) Patent No.: US 11,255,304 B1
(45) Date of Patent: Feb. 22, 2022

(54) TURBO FITTING FOR AN INTERNAL COMBUSTION ENGINE

(71) Applicant: Sergey Setlonok, Middle River, MD (US)

(72) Inventor: Sergey Setlonok, Middle River, MD (US)

(*) Notice: Subject to any disclaimer, the term of this patent is extended or adjusted under 35 U.S.C. 154(b) by 0 days.

(21) Appl. No.: 17/090,879

(22) Filed: Nov. 5, 2020

(51) Int. Cl.
*F02M 35/14* (2006.01)
*F02M 35/024* (2006.01)
*F02M 35/12* (2006.01)

(52) U.S. Cl.
CPC ...... *F02M 35/14* (2013.01); *F02M 35/02483* (2013.01); *F02M 35/1211* (2013.01)

(58) Field of Classification Search
CPC ............. F02M 35/14; F02M 35/02483; F02M 35/1211
See application file for complete search history.

(56) References Cited

U.S. PATENT DOCUMENTS 8,220,444 B2 * 7/2012 Cheung .................. F02M 29/06
123/590

* cited by examiner

*Primary Examiner* — Jacob M Amick
*Assistant Examiner* — Charles J Brauch
(74) *Attorney, Agent, or Firm* — Volta Law Group, LLC

(57) ABSTRACT

An article of manufacture for providing an automobile turbocharging fitting is disclosed. A turbo fitting is a funnel shaped device that is attached to an outgoing airflow port of an air filter intake enclosure and secured into an air flow line running to the input to a throttle body of an internal combustion engine. The inner diameter of the turbo fitting is reduced from its width at the air filter enclosure to its exit diameter in the air flow line. Air directional devices, which may be raised tabs or grooves, running the length of the inner surface of the turbo fitting. These air directional devices are oriented in a clockwise direction when viewed into the turbo fitting from the air filter enclosure end.

10 Claims, 6 Drawing Sheets

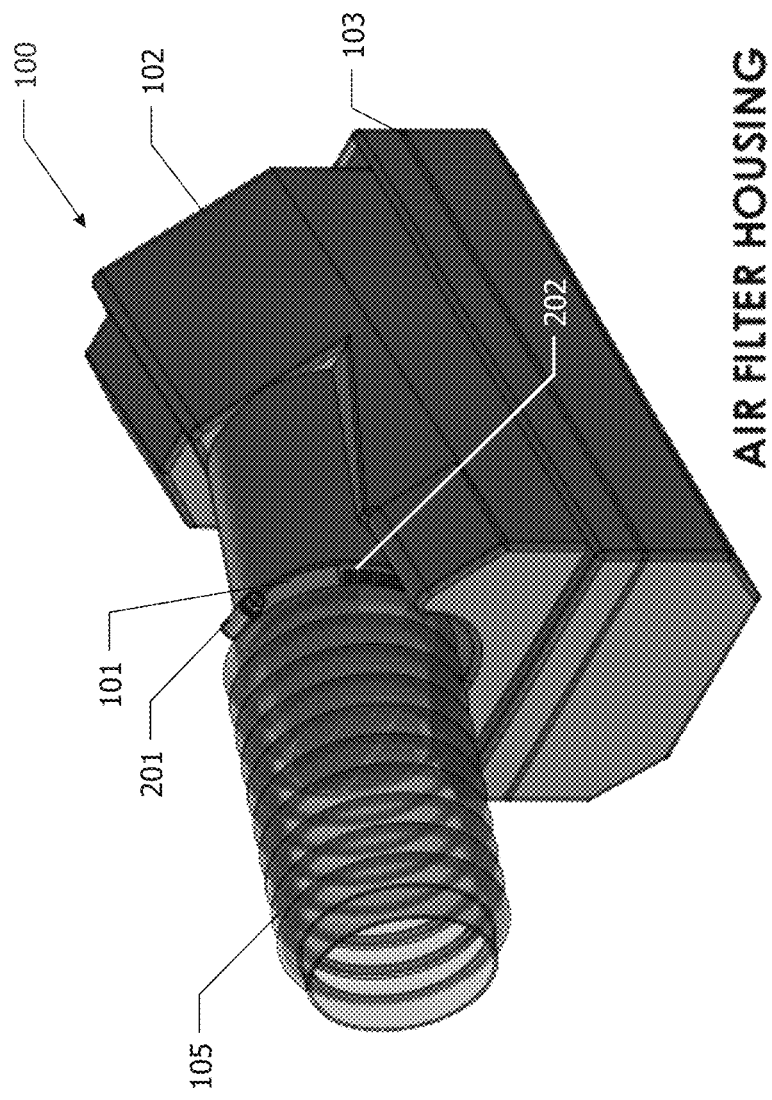

FIG. 2

THE TURBO FITTING IS AN AFTER MARKET ATTACHMENT, WHICH SNAPS ON TO THE EXISTING AIR FILTER HOUSING.
THE TURBO FITTING USES THE CONCEPT OF INCREASED AIR FLOW TO THE ENGINE. BY FUNNELING AIR THROUGH THE TURBO FITTING, AIR IS PRESSURIZED.
PRESSURE INCREASES THE AIR FLOW. (WITHOUT ANY ADDITIONAL MOVING PARTS). INCREASED AIR FLOW TO THE ENGINE INCREASES VEHICLE PERFORMANCE.

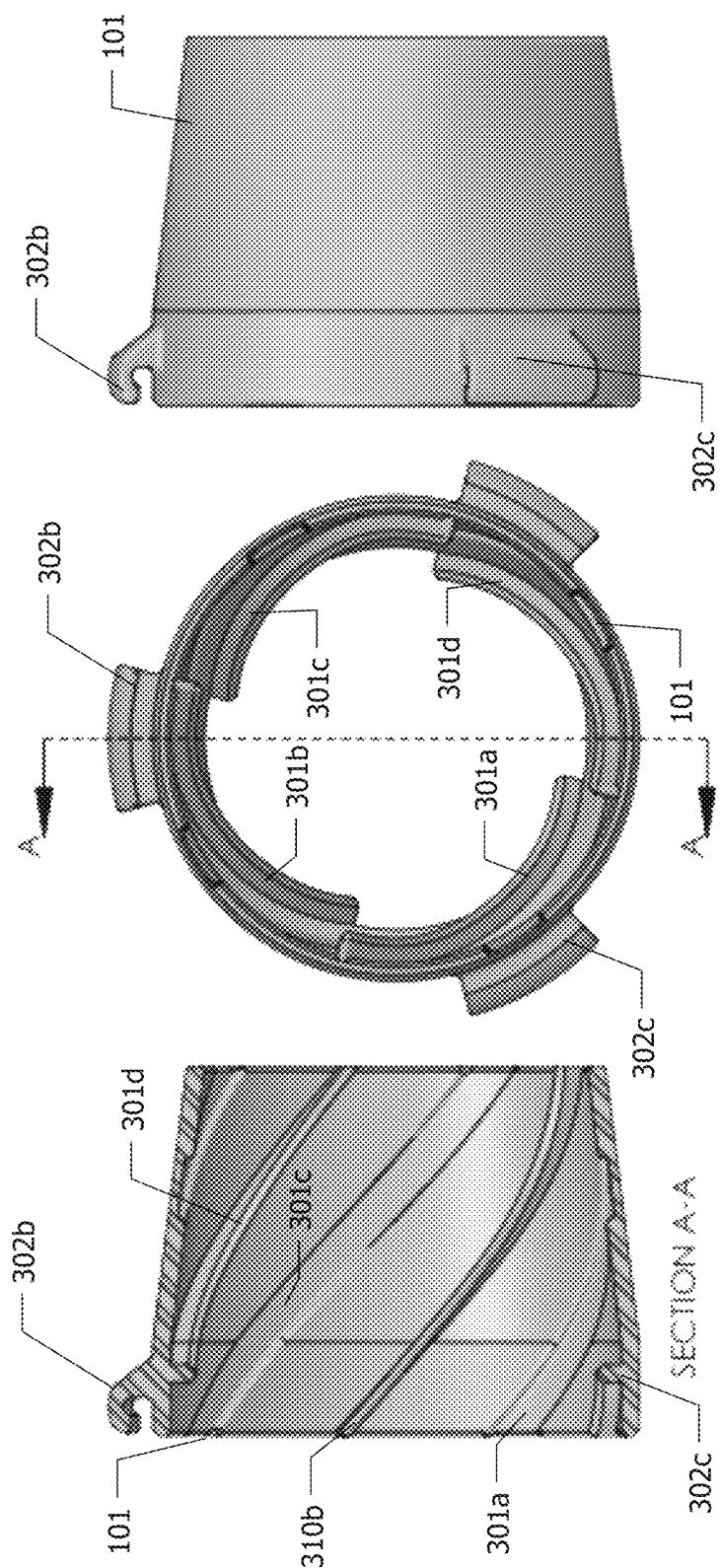

TURBO FITTING FOR AN INTERNAL COMBUSTION ENGINE

TECHNICAL FIELD

This application relates in general to an article of manufacture for providing engine performance, and more specifically, to an article of manufacture for providing an automobile turbocharging fitting.

BACKGROUND

In order to increase vehicle engine performance, air pressure may be increased on its way from an air intake, which is typically immediately before an air filter, to the combustion cylinders of the engine. When an accelerator is depressed in an automobile, a throttle body allows more air into the engine which increases the performance/acceleration of the vehicle. Turbocharging devices have been used to increase this air pressure that reaches the throttle body that have been constructed of air compressing fan that is placed within the intake air flow. These devices are powered by connecting a fan belt to the crank shaft of the engine that causes the fan to spin which in turn increases the air pressure. Such devices are expensive, complicated, and prone to break down from the high velocity moving parts of these devices.

Therefore, a need exists for an article of manufacture for providing an automobile turbocharging fitting. The present invention attempts to address the limitations and deficiencies of the prior solutions according to the principles and embodiments disclosed herein.

SUMMARY

In accordance with the present invention, the above and other problems are solved by providing an article of manufacture for providing an automobile turbocharging fitting according to the principles and example embodiments disclosed herein.

In one embodiment, the present invention is an article of manufacture for providing an automobile turbocharging fitting. A turbo fitting is a funnel shaped device that is attached to an outgoing airflow port of an air filter intake enclosure and secured into an air flow line running to the input to a throttle body of an internal combustion engine. The inner diameter of the turbo fitting is reduced from its width at the air filter enclosure to its exit diameter in the air flow line. Air flow control vanes combined with channels, run along the length of the inner surface of the turbo fitting. These air flow control surfaces are oriented in a clockwise direction when viewed into the turbo fitting from the air filter enclosure end.

In another aspect of the present disclosure, a turbo fitting for provides an automobile turbocharging fitting. The turbo fitting includes an air intake port coupled to an outgoing airflow port of an air intake and filter housing, an air exhaust port coupled to an air intake hose providing air intake to a throttle body, an inner surface between the air intake port and the air exhaust port, the inner surface being wider at the air intake port and narrower at the air exhaust port, a set of attachment tabs coupled to the air intake port for engaging the air intake and filter housing, and a set of air flow directional tabs positioned along the inner surface of the turbo fitting, each of the air flow directional tabs having a vane and a channel.

In another aspect of the present disclosure, the set of air flow directional tabs run along a length of the inner surface between the air intake port and the air exhaust port in a clockwise orientation following a 22.5° rotational path rotating 90° of the inner channel.

In another aspect of the present disclosure, the turbo fitting is made of material of the air intake and filter housing being capable to withstand the temperature and airflow between the air intake and filter housing to the throttle body.

In another aspect of the present disclosure, the air exhaust port fits within the air intake hose.

In another aspect of the present disclosure, the attachment tabs engage mating edges of the air exhaust port of the air intake and filter housing;

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only, and is not intended as a definition of the limits of the present invention.

BRIEF DESCRIPTION OF THE DRAWINGS

Referring now to the drawings in which like reference numbers represent corresponding parts throughout:

FIG. 2 illustrates a configured view of the example embodiment of the automobile turbocharging fitting according to the present invention.

FIG. 3a-c illustrates multiple views of an example embodiment of an automobile turbocharging fitting according to the present invention.

DETAILED DESCRIPTION

Figure 1:
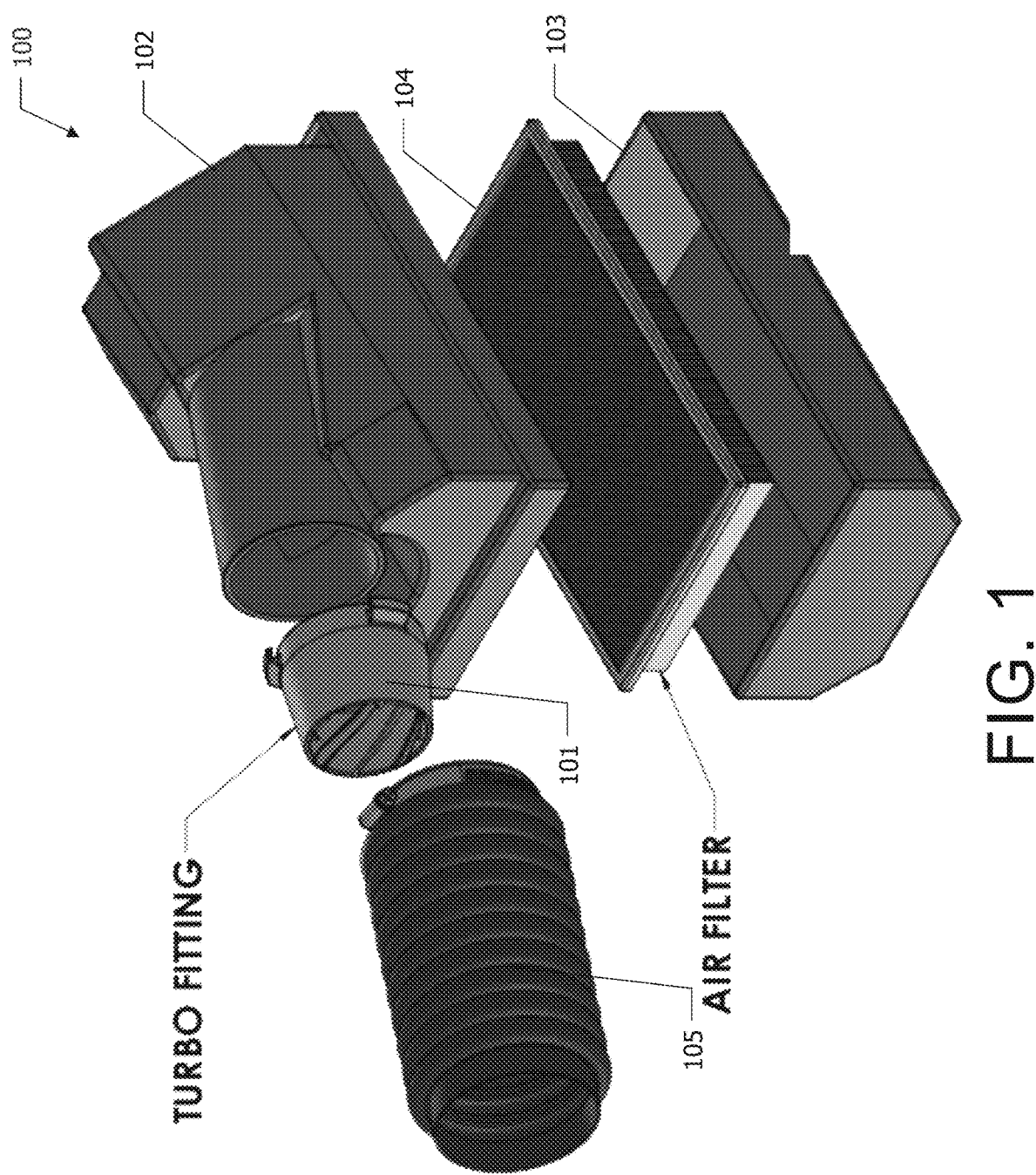
FIG. 1 illustrates an exploded view of an example embodiment for an article of manufacture for providing an automobile turbocharging fitting according to the present invention.

This application relates in general a system and method for providing engine performance, and more specifically, to an article of manufacture for providing an automobile turbocharging fitting according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

As used herein, the term "about" means that dimensions, sizes, formulations, parameters, shapes, and other quantities and characteristics are not and need not be exact, but may be approximated and/or larger or smaller, as desired, reflecting tolerances, conversion factors, rounding off, measurement error and the like, and other factors known to those of skill. Further, unless otherwise stated, the term "about" shall expressly include "exactly," consistent with the discussion above regarding ranges and numerical data.

The terms "customer," and "user" refer to an entity, e.g. a human, using the automobile engine with a turbo fitting associated with the invention. The term user herein refers to one or more users.

The term "invention" or "present invention" refers to the invention being applied for via the patent application with the title "Turbo Fitting for an internal Combustion Engine." Invention may be used interchangeably with turbo.

In general, the present disclosure relates a system and method for providing an automobile turbocharging fitting. To better understand the present invention, FIG. 1 illustrates an exploded view of an example embodiment for an article of manufacture for providing an automobile turbocharging fitting according to the present invention. The turbo fitting 101 connects an air filter enclosure 102-104 to an air intake hose 105 on its way to the combustion cylinders of an engine.

The turbo fitting 101, according to the present invention, is an attachment to the air intake and filter housing 102-104. This air intake and filter housing 102-104 forces air through an air filter 104 on its way to providing the air flow to the throttle body and the engine. By use of the turbo fitting 101 in this air flow of out of the air intake and filter housing 102-104, pressure is created. Under pressure, air flow is increased. More air moving to the engine, increases the level of oxygen for combustion. Higher rate of combustion increases the performance/acceleration of the vehicle.

The turbo fitting 101 operates by reducing the diameter of the air flow leaving the air intake and filter housing 102-104 before entering the air flow line 105 that feeds into the throttle body not shown. The air flow is compressed, raising the effective air pressure in the air line 105 as the diameter of the airflow is reduced. The turbo fitting 101 connects to an outgoing airflow port of the air intake and filter housing 102-104 on a wider end of the turbo fitting using a set of tabs that engage the air intake and filter housing 102-104. The other end of the turbo fitting 101, which is narrower than the wider end, fits into the air intake hose 105 that connects to the throttle body. The turbo fitting 101 connects to existing air intake hose 105 that is a short distance to the throttle body.

FIG. 2 illustrates a configured view of an example embodiment of an article of manufacture for providing an automobile turbocharging fitting according to the present invention. In is view of the present invention, the air intake and filter housing 102-103 is coupled around the air filter 104, not shown now inside the housing, with the turbo fitting 101 attached to the outgoing airflow port 201 before being inserted into the air intake hose 105. The air intake hose 105 may be secured to the turbo fitting 101 using a circular clamp 202. The turbo fitting 101 does not require much, if any additional space in the engine. The turbo fitting 101 has no moving parts and requires little or not maintenance. The turbo fitting 101 may be made of material similar or identical to the material used to construct the air intake and filter housing 102-103 that may withstand the temperature and airflow from the air intake and filter housing 102-104 to the throttle body.

FIG. 3a-c illustrates multiple views of an example embodiment of an automobile turbocharging fitting according to the present invention. FIG. 3a shows a front view of the turbo fitting 101 looking at the air intake and filter housing 102-104 end of the fitting. FIG. 3b shows a side view of the turbo fitting 101. FIG. 3c shows a front view of the turbo fitting at the air intake hose 105 end of the fitting.

A set of attachment tabs 302a-c are shown about the turbo fitting 101 at the air intake and filter housing 102-104 end of the fitting. Additional details regarding these attachment tabs are described below in reference to FIG. 6. A set of air flow directional tabs 301a-d are located along an inner surface of the turbo fitting 101. These air flow directional tabs 301a-d are each positioned along the length of the turbo fitting 101 running in a clockwise orientation. The air flow directional tabs having a vane and channel 301a-d follow a 22.5 degree rotational path. Therefore, from front to end, each vane and channel 301a-d rotate 90 degrees. There are four vanes and four channels, so all of them cover 360 degrees.

Figure 4:
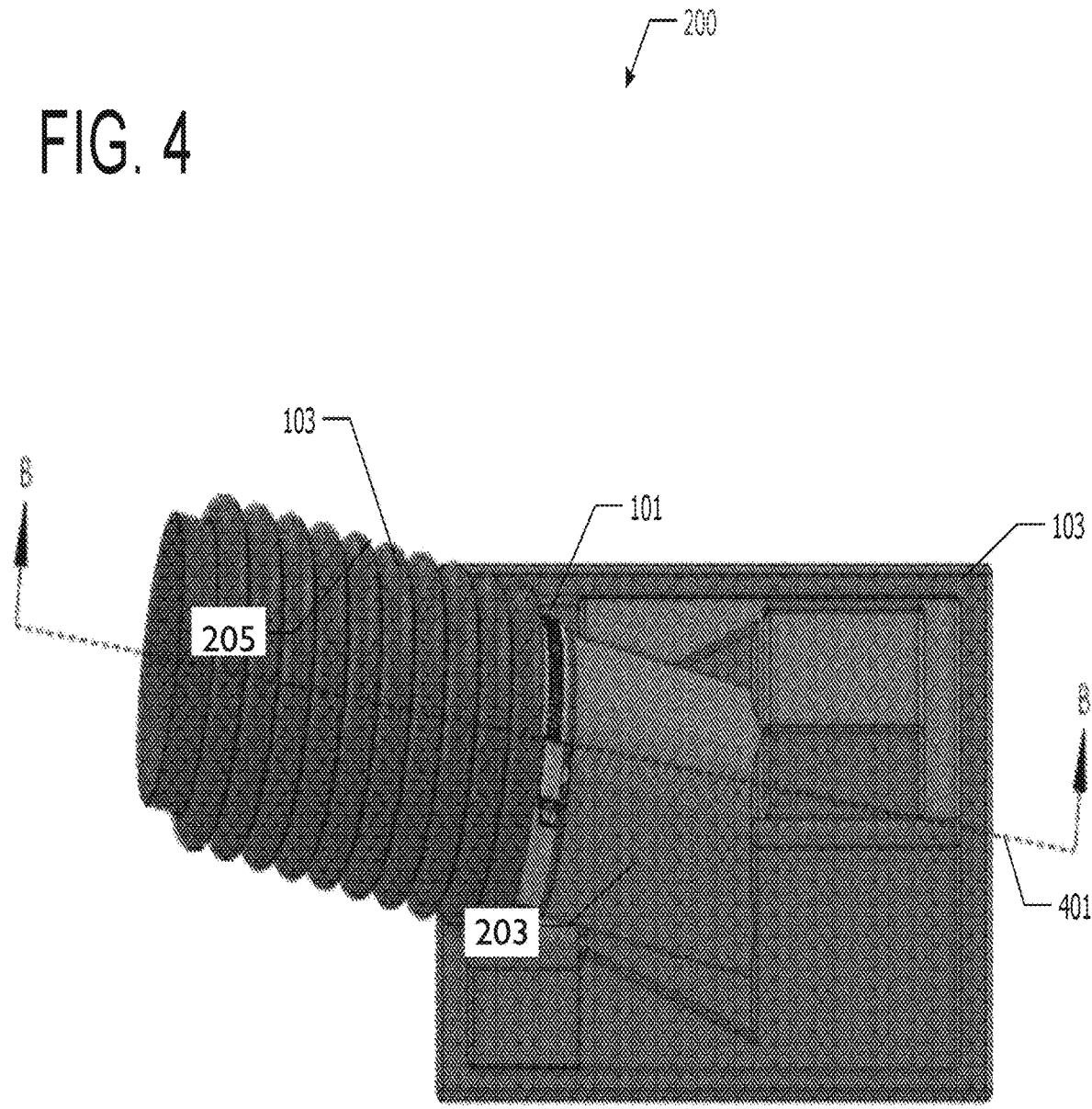
FIG. 4 illustrates a top view of the example embodiment for an article of manufacture for providing an automobile turbocharging fitting according to the present invention.

FIG. 4 illustrates a top view of the example embodiment for an article of manufacture for providing an automobile turbocharging fitting according to the present invention. The air intake and filter housing 102-103 is shown coupled to the air intake hose 105 by the turbo fitting 101. A sectional line 401 is shown illustrating the view through the assembled components as shown in the sectional view of FIG. 5.

Figure 5:
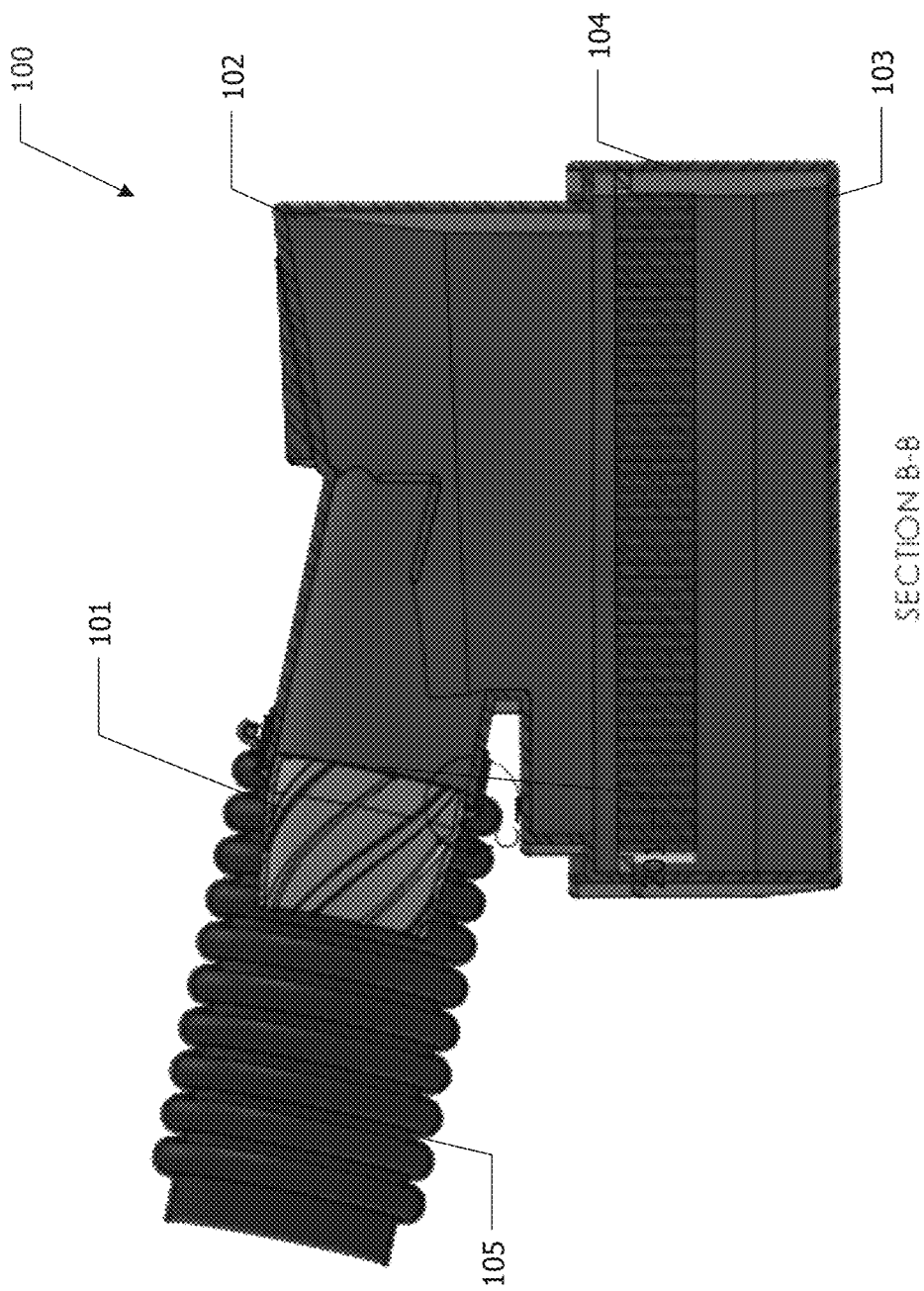
FIG. 5 illustrates a sectional view of a second example embodiment of an article of manufacture for providing an automobile turbocharging fitting according to the present invention.

FIG. 5 illustrates a sectional view of a second example embodiment of an article of manufacture for providing an automobile turbocharging fitting according to the present invention. The path of the air flow from the air intake and filter housing 102-103 to the throttle body (not shown) may be seen in this sectional view. The air enters the lower air intake and filter housing 102 passing through the air filter 104. The filtered air then flows out of the upper air intake and filter housing 102. As the air flow passes into the air intake hose 105, it passes through and is caused to rotate by the turbo fitting 101. Once leaving the fitting, the air flows a short distance through the air intake hose 105 and into the throttle body.

Figure 6:
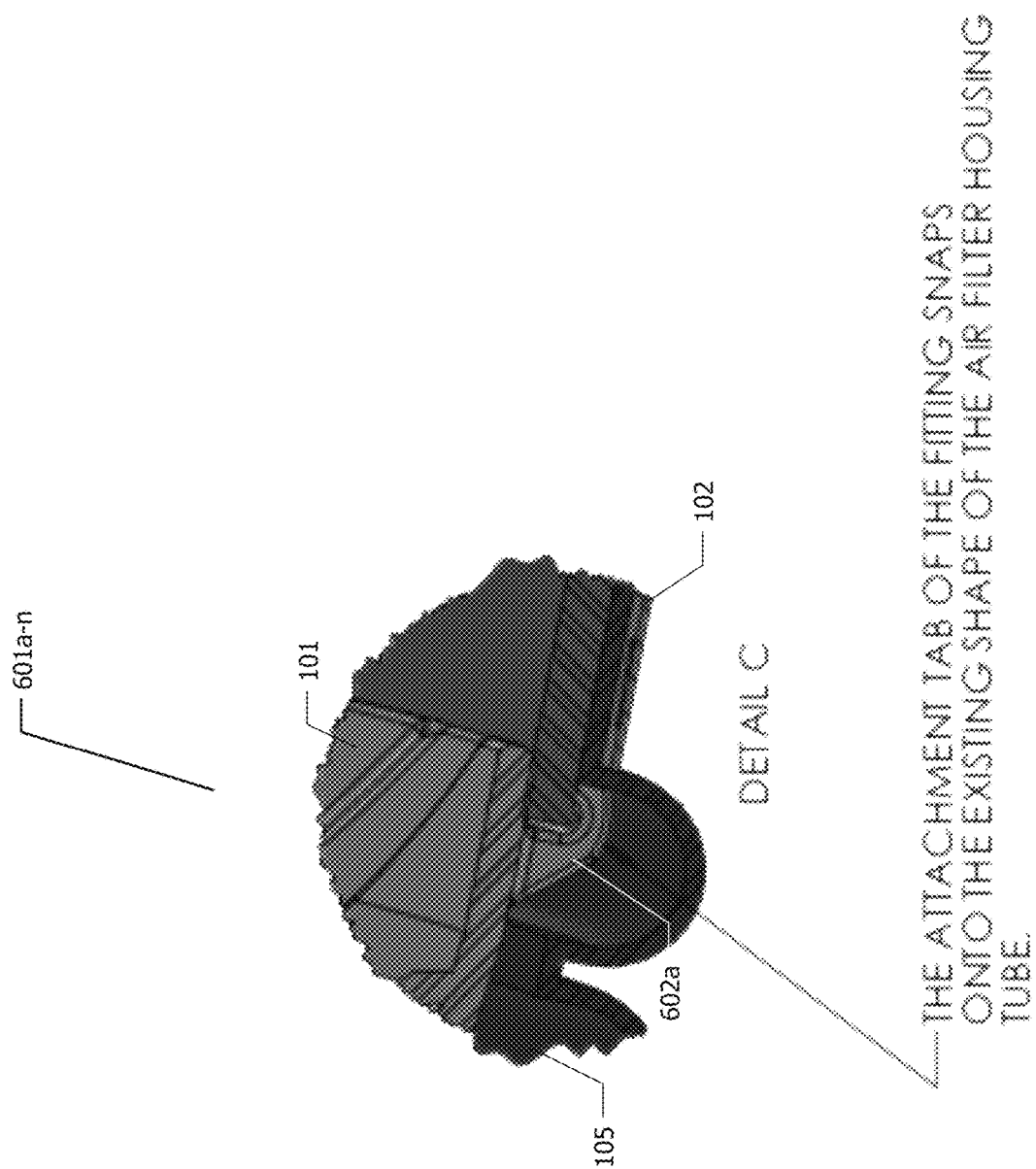
FIG. 6 illustrates a close up view of a connection tab within an automobile turbocharging fitting according to the present invention.

FIG. 6 illustrates a close up view of a connection tab within an automobile turbocharging fitting according to the present invention. A close up view of the turbo fitting 101 engaging mating edges of the air exhaust port of the upper air intake and filter housing 102 shows one of the attachment tabs 302c attaching to and encircling the outer edge of the opening to the upper air intake and filter housing 102. All three of the set of attachment tabs 302a-c engage the upper air intake and filter housing 102 in this manner.

Even though particular combinations of features are recited in the present application, these combinations are not intended to limit the disclosure of the invention. In fact, many of these features may be combined in ways not specifically recited in this application. In other words, any of the features mentioned in this application may be included to this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. An article of manufacture for providing an automobile turbocharging fitting, the turbo fitting comprises:
    an air intake port coupled to an outgoing airflow port of an air intake and filter housing;
    an air exhaust port coupled to an air intake hose providing air intake to a throttle body, the air exhaust port fits within the air intake hose;
    an inner surface between the air intake port and the air exhaust port, the inner surface being wider at the air intake port and narrower at the air exhaust port;
    a set of attachment tabs coupled to the air intake port for engaging the air intake and filter housing; and
    a set of air flow directional tabs positioned along the inner surface of the turbo fitting, each of the air flow directional tabs having a vane and a channel.

2. The turbo fitting according to claim 1, wherein the attachment tabs engage mating edges of the air exhaust port of the air intake and filter housing.

3. The turbo fitting according to claim 1, wherein the set of air flow directional tabs run along a length of the inner surface between the air intake port and the air exhaust port in a clockwise orientation.

4. The turbo fitting according to claim 3, wherein the set of air flow directional tabs run along a length of the inner surface comprise four vane and channel pairs where each vane and channel rotate 90° of the inner channel.

5. The turbo fitting according to claim 4, wherein each vane and channel follow a 22.5° rotational path.

6. The turbo fitting according to claim 1, wherein the air exhaust port coupled to is coupled to the air intake hose using a circular clamp.

7. The turbo fitting according to claim 1, wherein the turbo fitting is made of material of the air intake and filter housing being capable to withstand the temperature and airflow between the air intake and filter housing to the throttle body.

8. The turbo fitting according to claim 1, wherein the air intake and filter housing is coupled around an air filter element.

9. An article of manufacture for providing an automobile turbocharging fitting, the turbo fitting comprises:
    an air intake port coupled to an outgoing airflow port of an air intake and filter housing;
    an air exhaust port coupled to an air intake hose providing air intake to a throttle body, the air exhaust port fits within the air intake hose;
    an inner surface between the air intake port and the air exhaust port, the inner surface being wider at the air intake port and narrower at the air exhaust port;
    a set of attachment tabs coupled to the air intake port for engaging the air intake and filter housing, the attachment tabs engage mating edges of the air exhaust port of the air intake and filter housing; and
    a set of air flow directional tabs positioned along the inner surface of the turbo fitting, each of the air flow directional tabs having a vane and a channel, the set of air flow directional tabs run along a length of the inner surface between the air intake port and the air exhaust port in a clockwise orientation following a 22.5° rotational path rotating 90° of the inner channel;
    wherein the turbo fitting is made of material of the air intake and filter housing being capable to withstand the temperature and airflow between the air intake and filter housing to the throttle body.

10. The turbo fitting according to claim 9, wherein the air exhaust port coupled to is coupled to the air intake hose using a circular clamp; and
    the air intake and filter housing is coupled around an air filter element.

* * * * *